(No Model.)
O. KUTSCHE.
DUST COLLECTOR.
No. 432,491. Patented July 15, 1890.
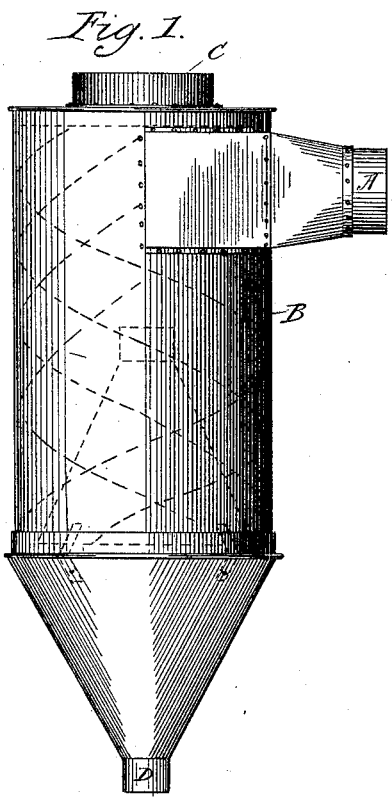
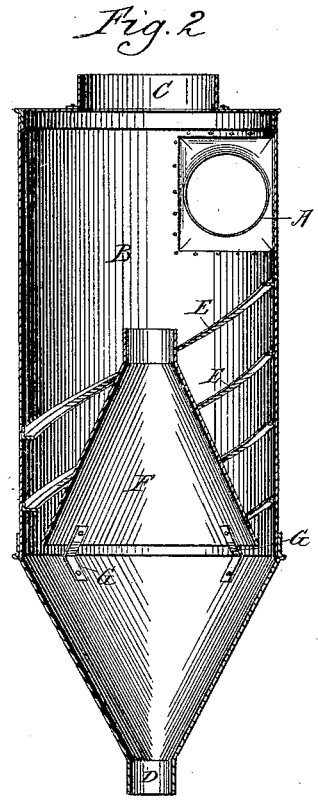
Witnesses,
L. S. Mann
Frederick G. Goodwin
Inventor,
Oswald Kutsche
By, Offield Towle & Phelps
Att'ys.

UNITED STATES PATENT OFFICE.

OSWALD KUTSCHE, OF CHICAGO, ILLINOIS, ASSIGNOR, BY MESNE ASSIGNMENTS, TO THE ALLINGTON & CURTIS MANUFACTURING COMPANY, OF MICHIGAN.

DUST-COLLECTOR.

SPECIFICATION forming part of Letters Patent No. 432,491, dated July 15, 1890.

Application filed October 9, 1886. Serial No. 215,793. (No model.)

*To all whom it may concern:*

Be it known that I, OSWALD KUTSCHE, a citizen of the United States, residing in the city of Chicago, in the county of Cook and State of Illinois, have invented a certain new and useful Improvement in Dust-Collectors, which I desire to protect by Letters Patent of the United States, of which the following is a specification.

My invention relates to dust-collectors for separating dust from air in mills, factories, &c., and has for its object the accomplishment of such separation in a simpler, more practical, and inexpensive manner than has heretofore been possible. Screens have been extensively used for this purpose; but separators or arresters built on this principle are necessarily very bulky, and do not free the air from the dust as thoroughly as is desirable. The separation of dust by this dust-collector is very complete and thorough and the mechanism required inexpensive.

In the drawings annexed, which form a part of this specification, Figure 1 is an elevation of my improved collector. Fig. 2 is a vertical longitudinal section of the same.

The dust-laden air is introduced through an inlet-pipe A to a cylindrical separating-chamber B, which has at its top an orifice C for the escape of the purified air, and at its base a second orifice D for the dust or other waste with which the air-current is loaded, the walls of the chamber converging at the base of the cylinder to the second orifice. A number of spiral flanges E lead from the mouth of the inlet-pipe around the sides of the cylinder to its base. Near the base of the cylinder, and just above the point where it begins to contract toward the discharge-orifice D, is fixed a hollow cone F, which is slightly smaller in diameter at its base than the cylinder and has its apex a short distance below the vertical center of the cylinder, and attached to the cylinder by brackets G. The junction of the delivery-pipe with the cylinder is such that the air coming through the former has a tangential direction of motion with reference to the cylinder. The circular walls of the cylinder immediately give it a circular motion, and the dust or other waste suspended in the moving air-column is at once thrown, by reason of its greater specific gravity, against the inner surface of the cylinder, all the waste or dust being thus collected into a compact mass. As soon as it begins to revolve about the cylinder, however, it is directed downward by the spiral flanges E toward the bottom of the cylinder, and finally reaches the vent-orifice D, whence it is projected, while the air, free from the dust, rises and passes out through the outlet C. The function of the cone F is to gather to the outside of the wall of the cylinder any floating particles of dust which may have become separated from the principal mass in moving down under the flanges E, and in part to preserve the circular motion of the air-currents and prevent their breaking up within the body of the cylinder, and, further, to protect the air at the base of the cylinder, just above the orifice D, from being too much disturbed. I cannot state with certainty that the function of this cone is precisely as herein set forth; but whatever the correct theory of its action I find that better results are obtained with it than without it, although the machine is very efficient even when it is omitted.

If preferred, the cone F may be made smaller relative to the cylinder than shown and set farther down toward the orifice D, so that its base will be below the point where the cylinder begins to converge.

What I claim is—

In a dust-collector, a circular separating-chamber provided with an inlet-pipe, an outlet-orifice at the end toward which its walls are converged, and a second outlet at the opposite end, guide-flanges for directing the dust to the first outlet, and the hollow cone F, placed, as shown, with a space between its base and the sides of the cylinder.

OSWALD KUTSCHE.

Witnesses:
FREDERICK C. GOODWIN,
E. L. HUBER.